A. WARD.
TAILORING.
5234X
PATENTED OCT. 11, 1828.
2 SHEETS—SHEET 1.
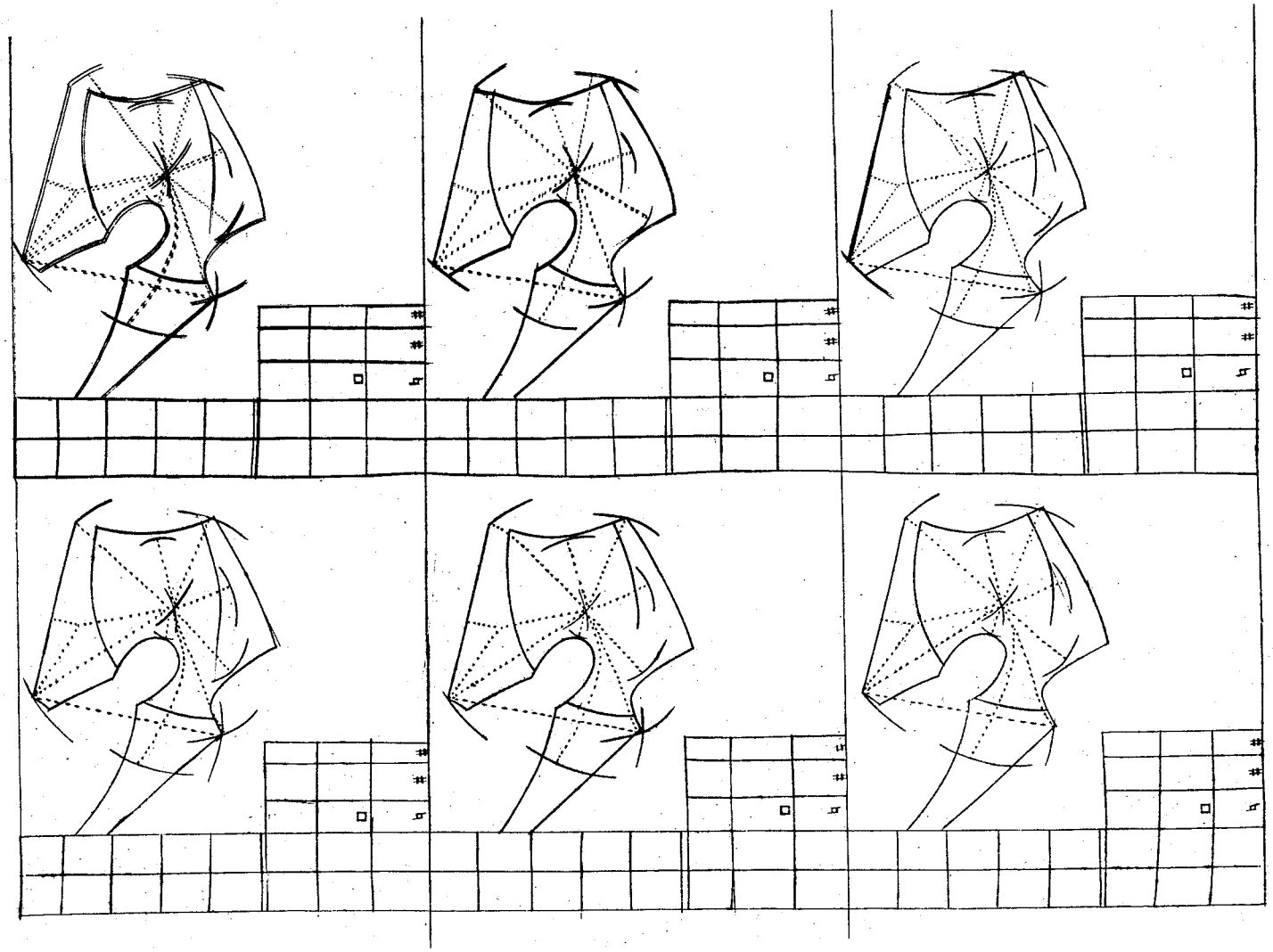

5234X
A. WARD.
TAILORING.
PATENTED OCT. 11, 1828.
2 SHEETS—SHEET 2.
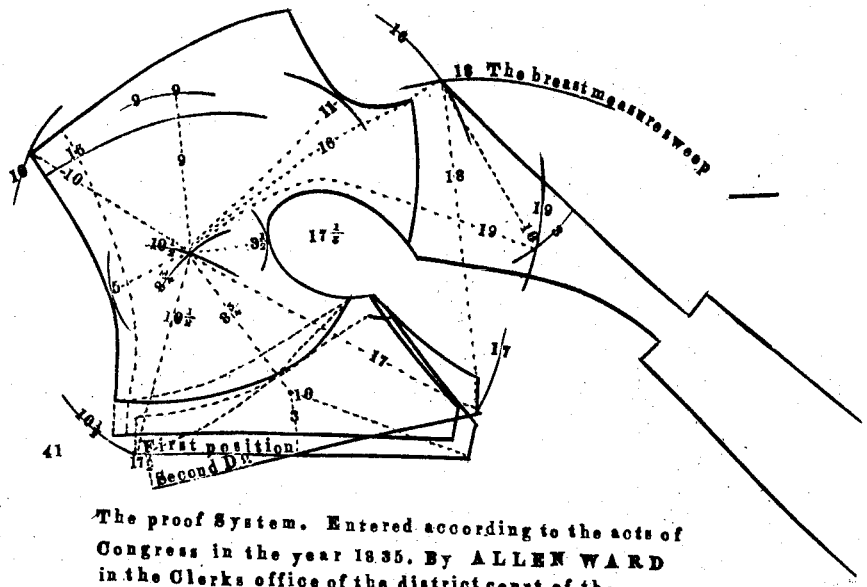
The proof System. Entered according to the acts of Congress in the year 1835. By ALLEN WARD in the Clerks office of the district court of the Eastern district of the State of Pennsylvania.

United States Patent Office

PTO - BOYERS, PA Duty Station

MISSING PAGE TEMPORARY NOTICE

PATENT # 5234X FOR ISSUE DATE 10-11-1828 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa